US009227605B2

(12) United States Patent
Okubo

(10) Patent No.: US 9,227,605 B2
(45) Date of Patent: Jan. 5, 2016

(54) VEHICLE STATE CALCULATING DEVICE AND VEHICLE CONTROL DEVICE

(75) Inventor: Ryosuke Okubo, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 458 days.

(21) Appl. No.: 13/581,711

(22) PCT Filed: Mar. 2, 2010

(86) PCT No.: PCT/JP2010/053362
§ 371 (c)(1),
(2), (4) Date: Aug. 29, 2012

(87) PCT Pub. No.: WO2011/108084
PCT Pub. Date: Sep. 9, 2011

(65) Prior Publication Data
US 2012/0323460 A1 Dec. 20, 2012

(51) Int. Cl.
*B60T 8/78* (2006.01)
*B60W 10/18* (2012.01)
*G06F 17/00* (2006.01)
*B60W 10/04* (2006.01)
*B60T 8/1761* (2006.01)
*B60T 8/172* (2006.01)
*B60W 40/10* (2012.01)
*B60W 40/105* (2012.01)

(52) U.S. Cl.
CPC ............ *B60T 8/17616* (2013.01); *B60T 8/172* (2013.01); *B60W 40/10* (2013.01); *B60W 40/105* (2013.01); *B60T 2250/04* (2013.01); *B60W 2520/26* (2013.01)

(58) Field of Classification Search
CPC .... B60T 8/17616; B60T 8/172; B60W 40/10; B60W 40/105

USPC ..................... 701/74, 75; 303/163
See application file for complete search history.

(56) References Cited

U.S. PATENT DOCUMENTS 4,774,667 A * 9/1988 Kuraoka et al. ............... 701/78
5,765,931 A * 6/1998 Ito et al. ....................... 303/183

FOREIGN PATENT DOCUMENTS

| JP | 61 282160 | 12/1986 |
| JP | 8 295223 | 11/1996 |
| JP | 9 301150 | 11/1997 |

OTHER PUBLICATIONS

International Search Report Issued Apr. 13, 2010 in PCT/JP10/053362 Filed Mar. 2, 2010.

* cited by examiner

*Primary Examiner* — Fadey Jabr
*Assistant Examiner* — Yazan A Soofi
(74) *Attorney, Agent, or Firm* — Oblon, McClelland, Maier & Neustadt, L.L.P.

(57) ABSTRACT

An actual slip ratio of a wheel is estimated from a slip ratio speed of a wheel calculated according to a running state of a vehicle based on relationship between a slip ratio of the wheel of the vehicle and the slip ratio speed of the wheel set in advance. Typically, the actual slip ratio is estimated supposing that the slip ratio of the wheel calculated according to the running state of the vehicle, when a change rate of the slip ratio speed becomes larger than a predetermined value set in advance, is a reference slip ratio determined in advance according to the relationship between the slip ratio and the slip ratio speed set in advance. Therefore, it is possible to improve control accuracy when controlling a state of the vehicle by decreasing an effect of operation by a driver and a road surface, for example.

6 Claims, 4 Drawing Sheets

VEHICLE STATE CALCULATING DEVICE AND VEHICLE CONTROL DEVICE

FIELD

The present invention relates to a vehicle state calculating device and a vehicle control device.

BACKGROUND

Patent literature 1 discloses as a conventional vehicle state calculating device or vehicle control device, an antilock brake control device of a vehicle, which calculates an estimated vehicle speed based on a wheel speed detected by wheel speed detecting means and wheel acceleration/deceleration calculated by wheel acceleration/deceleration calculating means, judges a slip ratio of a wheel based on the estimated vehicle speed and the wheel speed, and determines an operation control amount of brake fluid pressure adjusting means based on a result of judgment, for example.

CITATION LIST

Patent Literature

Patent Literature 1: Japanese Patent Application Laid-open No. H09-301150

SUMMARY

Technical Problem

The antilock brake control device of the vehicle disclosed in the above-described patent literature 1 has room for improvement of control accuracy when controlling a state of the vehicle such as a slip state of the wheel, for example.

The present invention is achieved in view of the above-descried circumstances and an object thereof is to provide the vehicle state calculating device and the vehicle control device capable of improving the control accuracy when controlling the state of the vehicle.

Solution to Problem

In order to achieve the above mentioned object, in a vehicle state calculating device according to the present invention, an actual slip ratio of a wheel is estimated from a slip ratio speed of the wheel calculated according to a running state of a vehicle based on relationship between a slip ratio of the wheel of the vehicle and the slip ratio speed of the wheel set in advance.

Further, in the vehicle state calculating device, it is possible to configure that the actual slip ratio is estimated using the reference slip ratio supposing that the slip ratio of the wheel calculated according to the running state of the vehicle, when a change rate of the slip ratio speed becomes larger than a predetermined value set in advance, is a reference slip ratio determined in advance according to the relationship between the slip ratio and the slip ratio speed set in advance.

Further, in the vehicle state calculating device, it is possible to configure that the actual slip ratio is estimated using the reference slip ratio supposing that the slip ratio of the wheel calculated according to the running state of the vehicle, when a parameter corresponding to a differential value of the slip ratio speed becomes larger than the predetermined value set in advance, is the reference slip ratio determined according to the relationship between the slip ratio and the slip ratio speed set in advance.

Further, in the vehicle state calculating device, it is possible to configure that a vehicle speed of the vehicle is calculated based on the estimated actual slip ratio and a wheel speed of the wheel.

In order to achieve the above mentioned object, in a vehicle control device according to the present invention, a slip state of a wheel is controlled by controlling braking/driving force generated at the wheel by using an actual slip ratio of the wheel estimated from a slip ratio speed of the wheel according to a running state of a vehicle based on relationship between a slip ratio of the wheel of the vehicle and the slip ratio speed of the wheel set in advance.

Advantageous Effects of Invention

The vehicle state calculating device and the vehicle control device according to the present invention have an effect of improving the control accuracy when controlling the state of the vehicle.

DESCRIPTION OF EMBODIMENTS

An embodiment of a vehicle state calculating device and a vehicle control device according to the present invention is hereinafter described in detail with reference to the drawings. Meanwhile, the present invention is not limited by the embodiment. Also, components in the following embodiment include a component, which can be easily replaced by one skilled in the art, or a substantially identical component.

Embodiment

Figure 1:
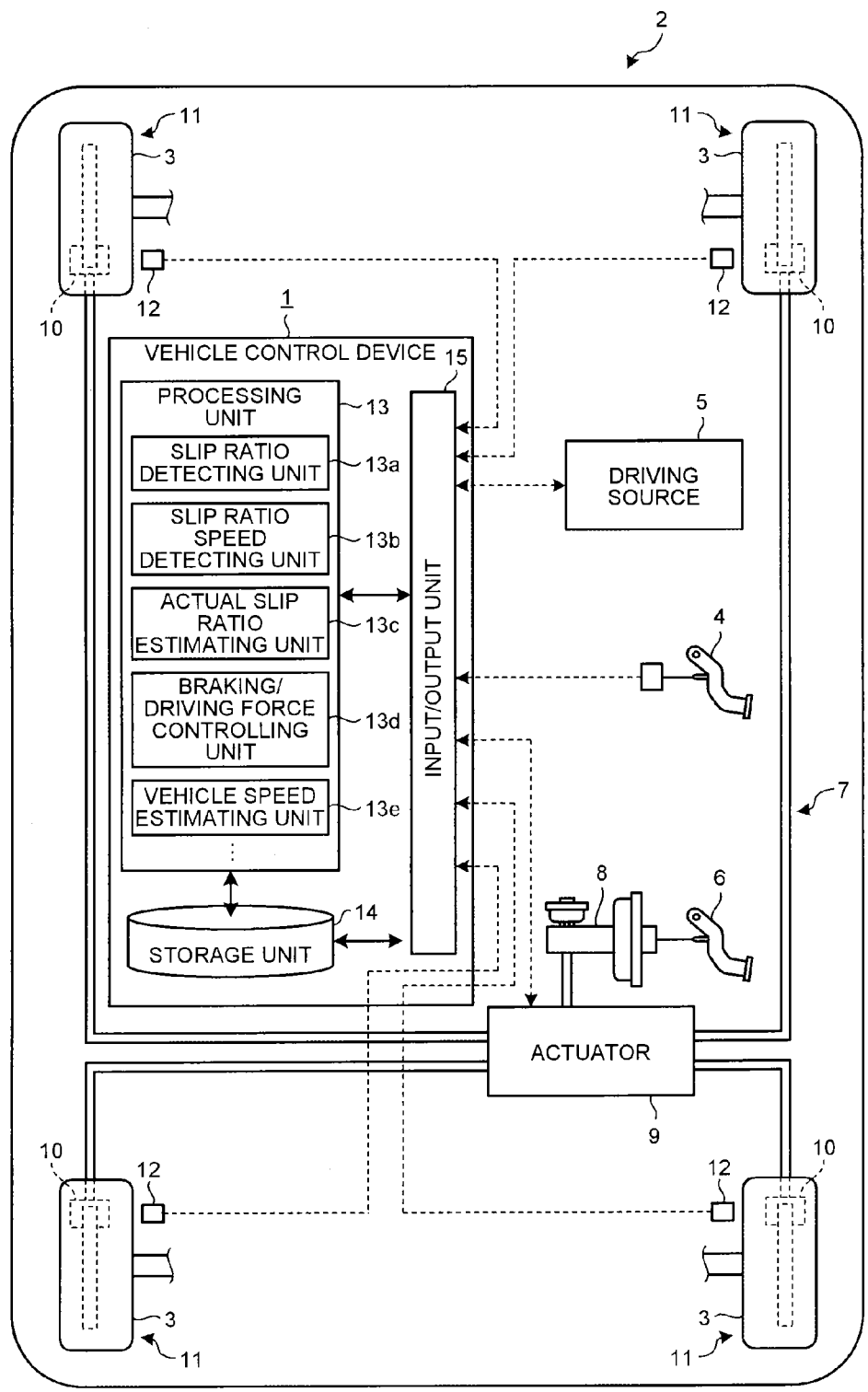
FIG. 1 is a schematic configuration diagram of a vehicle control device according to an embodiment.
Figure 2:
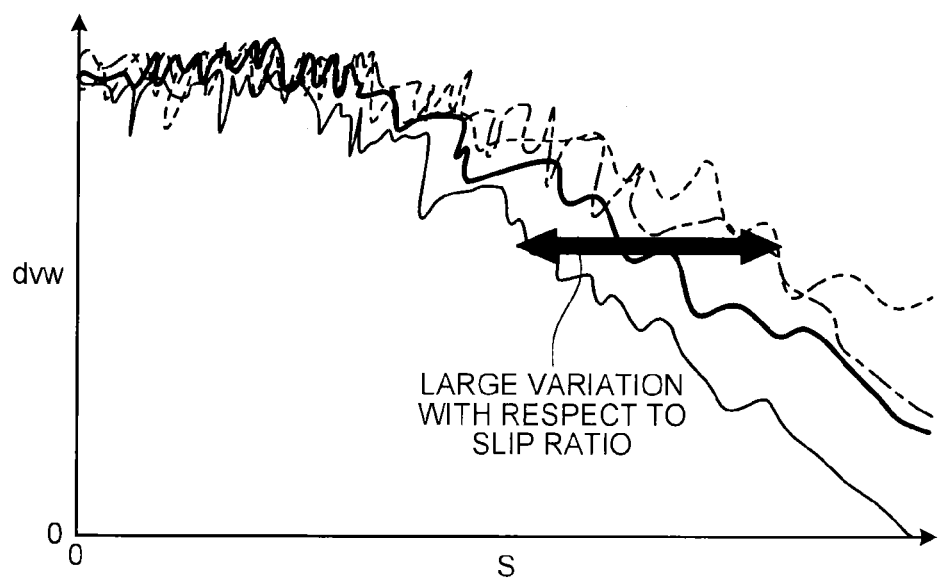
FIG. 2 is a diagram illustrating wheel acceleration with respect to a slip ratio.
Figure 3:
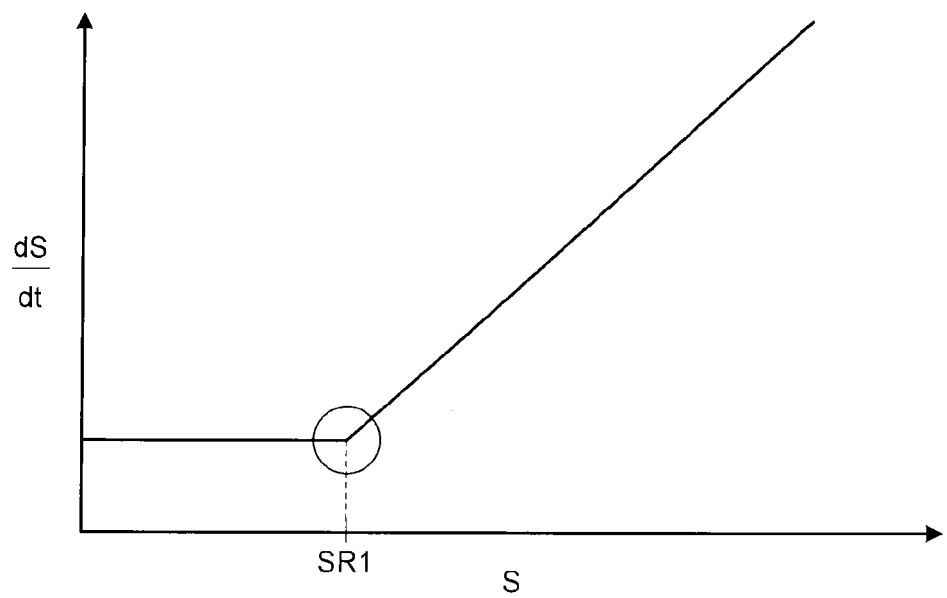
FIG. 3 is a diagram illustrating a slip ratio speed with respect to the slip ratio.
Figure 4:
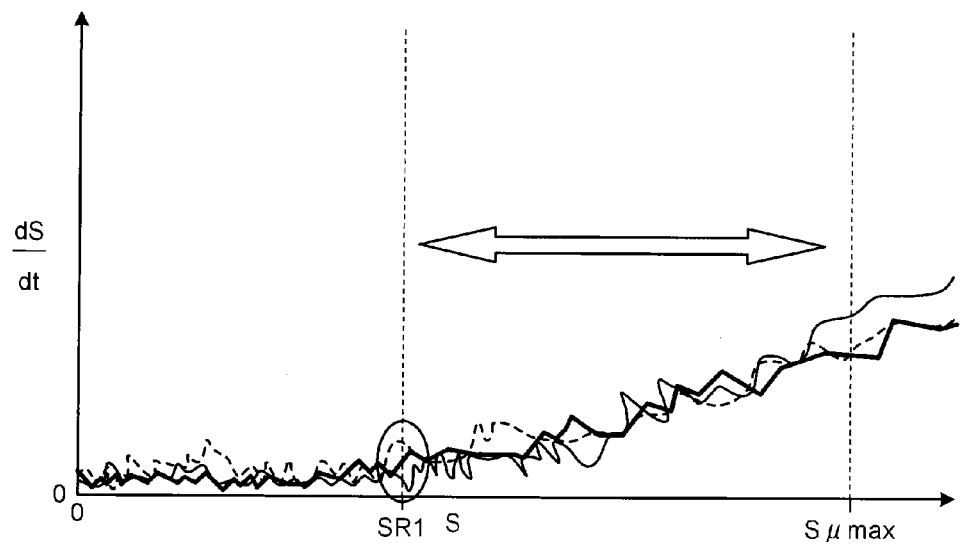
FIG. 4 is a diagram illustrating the slip ratio speed with respect to the slip ratio.
Figure 5:
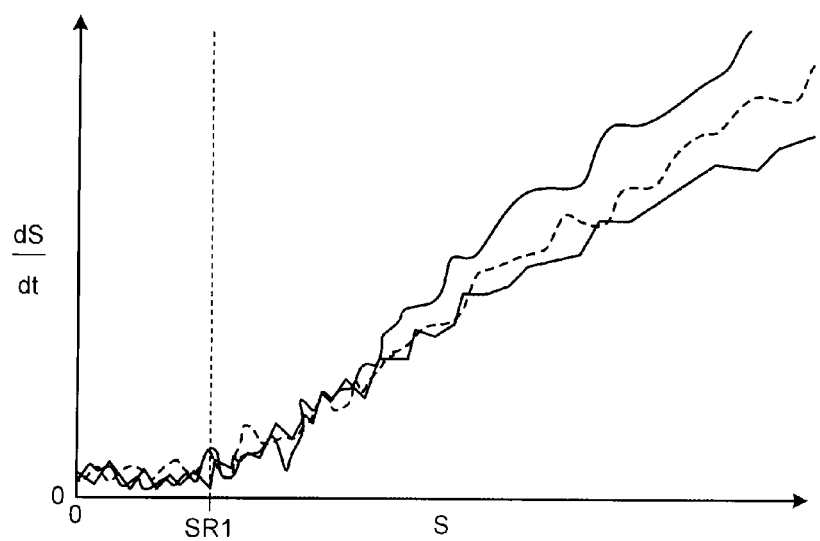
FIG. 5 is a diagram illustrating the slip ratio speed with respect to the slip ratio.
Figure 6:
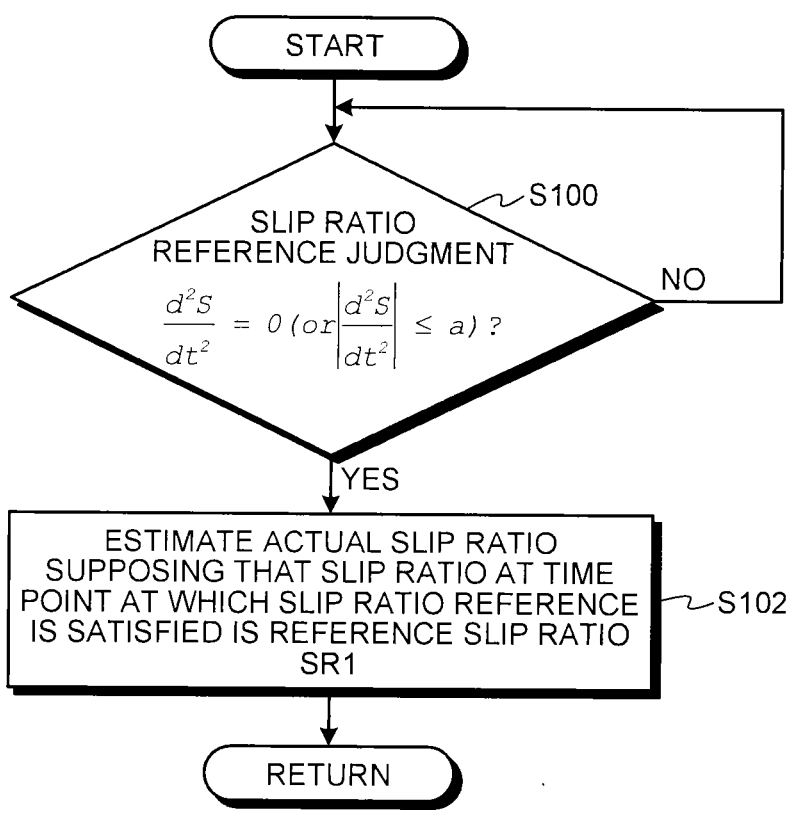
FIG. 6 is a flowchart explaining an example of control of the vehicle control device according to the embodiment.

FIG. 1 is a schematic configuration diagram of a vehicle control device according to an embodiment, FIG. 2 is a diagram illustrating wheel acceleration with respect to a slip ratio, FIGS. 3, 4, and 5 are diagrams illustrating a slip ratio speed with respect to the slip ratio, and FIG. 6 is a flowchart explaining an example of control of the vehicle control device according to the embodiment.

A vehicle control device 1 of this embodiment is mounted on a vehicle 2 as illustrated in FIG. 1 for controlling a slip state of a wheel 3 by controlling braking/driving force generated at the wheel 3 of the vehicle 2. Meanwhile, herein, the vehicle control device 1 also has a function as a vehicle state calculating device. That is to say, although it is hereinafter described that the vehicle control device 1 doubles as the vehicle state calculating device, the vehicle control device 1 is not limited thereto and it is also possible that the vehicle state calculating device and the vehicle control device are separately configured.

The vehicle 2 is provided with the vehicle control device 1, the wheel 3, an accelerator pedal 4, a driving source 5, a brake pedal 6, a braking device 7 and the like. In the vehicle 2, the driving source 5 generates power (torque) according to operation of the accelerator pedal 4 by a driver and the power is transmitted to the wheel 3 by means of a power transmission device (not illustrated) such as a transmission, a differential, and a drive shaft to generate the driving force at the wheel 3. Also, the vehicle 2 generates the braking force at the wheel 3 by operation of the braking device 7 according to operation of the brake pedal 6 by the driver.

The driving source 5 is a power source for running such as an internal combustion engine and an electric motor. A variety of well-known hydraulic braking devices of which hydraulic path from a master cylinder 8 through an actuator 9 to a wheel cylinder 10 is filled with brake oil being working fluid serve as the braking device 7. In the braking device 7, basically, a master cylinder pressure (operation pressure) is applied to the brake oil by the master cylinder 8 according to pedal force (operation force) acting on the brake pedal 6 by the operation of the brake pedal 6 by the driver. In the braking device 7, the master cylinder pressure acts as a wheel cylinder pressure (brake pressure) on each wheel cylinder 10, and according to this, a hydraulic braking unit 11 including a caliper, a brake pad, a disk rotor and the like operates to generate pressure braking force at the wheel 3. During this, in the braking device 7, the wheel cylinder pressure is appropriately adjusted according to an operation state by the actuator 9.

More specifically, the actuator 9 is composed of a hydraulic control device (hydraulic control circuit) controlled by the vehicle control device 1, for example. The actuator 9 includes a plurality of pipes, an oil reservoir, an oil pump, each hydraulic pipe connected to each wheel cylinder 10 provided on each wheel 3, a plurality of electromagnetic valves for increasing, decreasing, and maintaining a hydraulic pressure of each hydraulic pipe and the like.

The actuator 9 is capable of adjusting the wheel cylinder pressure acting on the wheel cylinder 10 according to an operation amount (depression amount) of the brake pedal 6 by the driver by driving of the oil pump and a predetermined electromagnetic valve according to a control instruction of the vehicle control device 1, for example, at the time of normal operation. Also, the actuator 9 can operate in a pressure increasing mode in which the wheel cylinder pressure acting on the wheel cylinder 10 is increased, a maintaining mode in which this is maintained substantially constant, a pressure decreasing mode in which this is decreased and the like by the driving of the oil pump and the predetermined electromagnetic valve according to the control instruction of the vehicle control device 1, for example, at the time of vehicle control to be described later. The actuator 9 is capable of separately setting the above-described mode for each wheel cylinder 10 provided on each wheel 3 according to a running state of the vehicle 2 by the control by the vehicle control device 1. That is to say, the actuator 9 is capable of separately adjusting the braking force acting on each wheel 3 according to the running state of the vehicle 2 irrespective of the operation of the brake pedal 6 by the driver.

Herein, the vehicle control device 1 includes an electronic circuit mainly composed of a well-known microcomputer including a CPU, a ROM, a RAM, and an interface. An electric signal corresponding to a detection result detected by various sensors attached to each part of the vehicle 2 such as each wheel speed sensor 12, which detects a wheel speed of each wheel 3, is input to the vehicle control device 1. The vehicle control device 1 controls the driving source 5 and the actuator 9 by executing a stored control program based on various input signals and various maps input from the various sensors.

The vehicle control device 1 of this embodiment is capable of realizing an ABS (antilock brake system) function, a TRC (traction control system) function and the like of the vehicle 2 by controlling the driving source 5 and the actuator 9 according to the running state of the vehicle 2. That is to say, when the wheel 3 slips in association with depression operation of the accelerator pedal 4 (accelerating operation) and the depression operation of the brake pedal 6 (braking operation) by the driver, the vehicle control device 1 applies optimal braking/driving force according to the running state of the vehicle 2 to the wheel 3 by adjusting the braking/driving force of the wheel 3 in the slip state. The vehicle control device 1 controls the slip state of the wheel 3, for example, the slip ratio of the wheel 3, which is an index indicating a slip (skid) between a tire of the wheel 3 and a road surface, by controlling the braking/driving force generated at the wheel 3 by adjusting an output of the driving source 5 and the wheel cylinder pressure (hereinafter, referred to as "brake pressure" unless otherwise noted) as the brake pressure of the braking device 7. The vehicle control device 1 controls the braking/driving force generated at the wheel 3 such that an actual slip ratio becomes a target slip ratio. Herein, the target slip ratio is the slip ratio in the vicinity of a peak $\mu$ slip ratio at which a friction coefficient of the tire of the wheel 3 is the maximum, for example. The target slip ratio may have a predetermined range. The vehicle control device 1 executes control of the slip ratio (slip ratio control) according to the running state of the vehicle 2 so as to realize the ABS function and the TRC function of the vehicle 2.

For example, the vehicle control device 1 executes the above-described slip ratio control as braking force control when the ABS function operates for inhibiting the slip, which might occur at the wheel 3 when the braking device 7 operates according to the depression operation of the brake pedal 6 by the driver. In this case, the vehicle control device 1 controls the braking force generated at the wheel 3 by adjusting the brake pressure of the braking device 7 such that the actual slip ratio becomes the target slip ratio. The vehicle control device 1 decreases the brake pressure to decrease the braking force when the actual slip ratio becomes larger than the target slip ratio, and on the other hand, increases the brake pressure to increase the braking force when the actual slip ratio becomes smaller than the target slip ratio. The vehicle control device 1 can decrease a braking distance of the vehicle 2 while preventing brake lock and improve vehicle stability and handling by repeating them.

When the vehicle control device 1 judges start of the above-described slip ratio control based on the slip ratio of the wheel 3 and a parameter corresponding to the same, for example, since the slip ratio of the wheel 3 used for the judgment and the parameter itself such as a vehicle speed of the vehicle 2 for calculating the same are estimated values estimated based on a mean value of the wheel speeds of the wheels 3 and the like, for example, there might be variation in the judgment of the start of the control depending on detection accuracy thereof. Therefore, there is a case in which the vehicle control device 1 makes a fact that a predetermined physical amount, which varies according to the running state of the vehicle 2, becomes larger than a control start value a control start trigger, for example, and corrects the slip ratio according to this. In this case, the vehicle control device 1 may make timing of the start of the slip ratio control appropriate, for example.

However, when the wheel acceleration of the wheel 3 and the like is used for setting of reference of the above-described slip ratio and the control start trigger as the predetermined physical amount, which varies according to the running state of the vehicle 2, for example, there might be the variation in the slip ratio, which is the reference, for example, and according to this, an operation area in which control accuracy is not stable might be present. This is possibly because the wheel acceleration of the wheel 3 used as the predetermined physical amount has relatively large variation with respect to the slip ratio as in an S-dVW (slip ratio-wheel acceleration) diagram illustrated in FIG. 2 and so-called robustness, which is relatively low, with respect to uncertain variation in the slip ratio by disturbance, a design error and the like, and this is susceptible to road surface μ of the road surface on which the vehicle runs (snowy road, for example), the vehicle speed of the vehicle 2, and a load, for example. In FIG. 2, a plurality of S-dVW lines with different conditions such as the road surface μ, the vehicle speed of the vehicle 2, the load, a pneumatic pressure of the tire, and a manner of depressing the brake pedal 6 are illustrated.

Therefore, the vehicle control device 1 of this embodiment improves the control accuracy when controlling the state of the vehicle 2 by estimating the actual slip ratio of the wheel 3 from the slip ratio speed of the wheel 3 calculated according to the running state of the vehicle 2. Herein, the vehicle control device 1 improves the control accuracy when controlling the slip state of the wheel 3 as the state of the vehicle 2 by controlling the slip state of the wheel 3 by controlling the braking/driving force generated at the wheel 3 based on the actual slip ratio of the wheel 3 estimated as above. Meanwhile, in following description, the slip ratio control (braking force control) when the ABS function operates is described.

The vehicle control device 1 includes a processing unit 13, which performs a variety of processes, a storage unit 14 in which a computer program for controlling each unit of the vehicle 2 and the like is stored, a drive circuit not illustrated, which drives each unit of the vehicle 2, and an input/output unit 15 to which the various sensors are connected and they are connected to one another so as to be able to communicate signals. In the vehicle control device 1, the processing unit 13 is functionally-conceptually provided with a slip ratio detecting unit 13a, which obtains the slip ratio of the wheel 3 according to the running state of the vehicle 2, a slip ratio speed detecting unit 13b, which obtains the slip ratio speed of the wheel 3 according to the running state of the vehicle 2, an actual slip ratio estimating unit 13c, which estimates an actual slip ratio being the actual slip ratio of the wheel 3, and a braking/driving force controlling unit 13d, which controls the braking/driving force acting on the wheel 3 of the vehicle 2.

The slip ratio detecting unit 13a obtains the slip ratio of the wheel 3 by using a variety of well-known methods. The slip ratio detecting unit 13a obtains the slip ratio by using an equation (1) in following Equation 1 based on the wheel speed of each wheel 3 detected by the wheel speed sensor 12 and the vehicle speed of the vehicle 2 estimated from the mean value of the wheel speeds of the wheels 3, for example. In the equation (1), S, Vw, and Vr represent the slip ratio, the wheel speed, and the vehicle speed, respectively. Meanwhile, the slip ratio is calculated corresponding to each wheel 3 based on each detection value by each wheel speed sensor 12. Hereinafter, it is described supposing that calculation, the judgment, and the control regarding the slip ratio are performed for each wheel 3 unless otherwise noted.

$$S = \frac{Vr - Vw}{Vr} \quad (1)$$

The slip ratio speed detecting unit 13b obtains the slip ratio speed of the wheel 3 by using a variety of well-known methods. The slip ratio speed detecting unit 13b may obtain a slip ratio speed (in other words, a change speed of the slip ratio) dS/dt of the wheel 3 by calculating a temporal differential value of the slip ratio obtained by the slip ratio detecting unit 13a, for example.

Meanwhile, the slip ratio speed detecting unit 13b may also obtain the slip ratio speed dS/dt by calculating a change amount per unit time of the slip ratio S. Also, the slip ratio speed detecting unit 13b may approximately calculate the slip ratio speed dS/dt based on wheel acceleration dVW of the wheel 3 and the vehicle speed Vr of the vehicle 2 irrespective of the slip ratio S by using an equation (2) in following Equation 2. In the equation (2), α represents mean deceleration at the time of braking of the vehicle 2, dVW represents the wheel acceleration of the wheel 3, and Vr represents the vehicle speed of the vehicle 2. In this case, the wheel acceleration dVW of the wheel 3 and the vehicle speed Vr of the vehicle 2 may be calculated based on the detection value by each wheel speed sensor 12, for example. Also, the mean deceleration α may be set in advance according to a result of a test and the like, for example.

$$\frac{dS}{st} \approx -\frac{0.9\alpha + dVW}{Vr} \quad (2)$$

Meanwhile, herein, in the slip ratio speed obtained by the slip ratio speed detecting unit 13b in the above-described manner, a degree of contribution of the vehicle speed becomes relatively small and the degree of contribution of the value of the wheel speed becomes relatively large by differentiation of the slip ratio, for example. Since the detection value by each wheel speed sensor 12 is used, the wheel speed itself has relatively high reliability as compared to the vehicle speed estimated from the mean value of the wheel speeds of the wheels 3 and the like. Therefore, out of estimation accuracy of the slip ratio obtained by the equation (1) and the like and the estimation accuracy of the slip ratio speed, there is tendency that the estimation accuracy of the slip ratio speed has the relatively high reliability.

The actual slip ratio estimating unit 13c estimates the actual slip ratio, which is the actual slip ratio of the wheel 3, from the slip ratio speed of the wheel 3 calculated according to the running state of the vehicle 2 based on relationship between the slip ratio and the slip ratio speed set in advance.

Herein, the relationship between the slip ratio and the slip ratio speed set in advance is the relationship as illustrated in an S-dS/dt (slip ratio-slip ratio speed) diagram in FIG. 3, for example. As illustrated in the drawing, the slip ratio speed is maintained substantially constant without variation with respect to change in slip ratio when the slip ratio is within a range in the vicinity of 0. When the slip ratio reaches a predetermined slip ratio SR1, the slip ratio speed starts varying according to the change in slip ratio. In other words, the predetermined slip ratio SR1 is the slip ratio when it is changed from a state in which the slip ratio speed is maintained substantially constant without the variation with respect to the change in slip ratio to a state in which this varies according to the change in slip ratio. The predetermined slip ratio SR1 tends to be substantially constant according to a vehicle property of the vehicle 2 and a tire property of the wheel 3. Herein, the predetermined slip ratio SR1 is made a reference slip ratio SR1.

The reference slip ratio SR1 basically is an absolute value determined according to the vehicle property of the vehicle 2 and the tire property of the wheel 3 and is the value with relatively higher robustness. Herein, a plurality of S-dS/dt lines with different conditions such as the road surface μ, the vehicle speed of the vehicle 2, the load, the pneumatic pressure of the tire, and the manner of depressing the brake pedal 6 are illustrated in FIGS. 4 and 5. As illustrated in the S-dS/dt diagrams illustrated in FIGS. 4 and 5, the slip ratio of the wheel 3 tends to basically change substantially linearly, that is to say, with a substantially constant slip ratio speed up to few % irrespective of the conditions (the load, the vehicle speed, the pneumatic pressure, the operation such as the manner of depressing the brake pedal 6 by the driver and the like). A point from which the slip ratio speed is not constant, that is to say, the above-described reference slip ratio SR1 tends to be insusceptible to the road surface μ of the road surface on which the vehicle is running, the vehicle speed of the vehicle 2, the load and the like, for example, with the relatively small variation with respect to the slip ratio and the relatively high robustness with respect to the uncertain variation in the slip ratio by the disturbance, the design error and the like. That is to say, the reference slip ratio SR1 according to the point at which the slip ratio speed changes tends to be substantially the same slip ratio according to the tire property of the wheel 3 irrespective of the condition such as the road surface μ, the vehicle speed of the vehicle 2, the load, the pneumatic pressure of the tire, and the manner of depressing the brake pedal 6.

The actual slip ratio estimating unit 13c sets in advance to store the slip ratio from which the slip ratio speed is not constant as the reference slip ratio SR1 by utilizing this phenomenon and uses the reference slip ratio SR1 as a reference value for correcting the slip ratio, which is a control amount of the slip ratio control (a value, which should be adjusted to a desirable value in the control). Then, it becomes possible that the vehicle control device 1 executes the control with the high robustness with respect to the variation in various conditions even when it is configured such that absolute vehicle speed and slip ratio are correctly detected with difficulty by executing the slip ratio control by using the slip ratio corrected based on the reference slip ratio. Meanwhile, the S-dS/dt diagram corresponding to FIG. 3 and the reference slip ratio SR1 are the values determined to a certain degree according to the vehicle property of the vehicle 2 and the tire property of the wheel 3 as described above, and they may be set in advance by experiment to be stored in the storage unit 14 or may be learned and updated by various pieces of learning control.

The actual slip ratio estimating unit 13c corrects the slip ratio obtained by the slip ratio detecting unit 13a based on the reference slip ratio SR1 and estimates the actual slip ratio, which is the actual slip ratio, thereby relatively improving the estimation accuracy of the actual slip ratio.

Herein, the actual slip ratio estimating unit 13c estimates the actual slip ratio, which is the actual slip ratio of the wheel 3, supposing that the slip ratio of the wheel 3 calculated according to the running state of the vehicle 2 by the slip ratio detecting unit 13a when a change rate of the slip ratio speed becomes larger than a predetermined value set in advance is the reference slip ratio SR1 determined in advance according to the relationship between the slip ratio and the slip ratio speed set in advance as described above.

Specifically, the actual slip ratio estimating unit 13c monitors the slip ratio speed obtained by the slip ratio speed detecting unit 13b and detects the point (time point) at which it is changed from the state in which the slip ratio speed is constant. The actual slip ratio estimating unit 13c can detect that it is changed from the state in which the slip ratio speed is constant when the change rate of the slip ratio speed becomes larger than the predetermined value set in advance as described above. In this case, the actual slip ratio estimating unit 13c may obtain a change rate $d^2S/dt^2$ of the slip ratio speed as a parameter corresponding to a differential value of the slip ratio speed dS/dt by calculating the temporal differential value of the slip ratio speed dS/dt obtained by the slip ratio speed detecting unit 13b or may obtain the change rate $d^2S/dt^2$ of the slip ratio speed by calculating the change amount per unit time of the slip ratio speed dS/dt. Herein, the predetermined value set in advance is a slip ratio reference judging threshold value set for the change rate of the slip ratio speed for judging whether the slip ratio speed varies with respect to the change in slip ratio and typically is "0" or a value in the vicinity of "0".

The actual slip ratio estimating unit 13c estimates the actual slip ratio by correcting the slip ratio calculated by the slip ratio detecting unit 13a supposing that the slip ratio calculated by the slip ratio detecting unit 13a at a time point at which the change rate of the slip ratio speed becomes larger than the predetermined value set in advance, that is to say, at the time point at which it is changed from the state in which the slip ratio speed is constant is the slip ratio identical to the reference slip ratio SR1. That is to say, the actual slip ratio estimating unit 13c corrects the slip ratio calculated by the slip ratio detecting unit 13a at the time point at which the change rate of the slip ratio speed becomes larger than the predetermined value set in advance based on the reference slip ratio SR1, that is to say, this figures out difference between the calculated slip ratio and the reference slip ratio SR1 and estimates the actual slip ratio by correcting the calculated slip ratio based on the difference. Then, the actual slip ratio estimating unit 13c may estimate the actual slip ratio by successively correcting the slip ratio calculated by the slip ratio detecting unit 13a according to the above-described figured out difference after the time point at which it is changed from the state in which the slip ratio speed is constant. As a result, the actual slip ratio estimating unit 13c can relatively improve the estimation accuracy of the actual slip ratio.

Meanwhile, the vehicle control device 1 may be provided with a vehicle speed estimating unit 13e, which estimates the vehicle speed. The vehicle speed estimating unit 13e is capable of calculating the vehicle speed of the vehicle 2 from the equation (1) based on the actual slip ratio estimated by the actual slip ratio estimating unit 13c as described above and the wheel speed detected by the wheel speed sensor 12 for example. For example, based on the actual slip ratio obtained by correcting the slip ratio calculated by the slip ratio detecting unit 13a at the time point at which it is changed from the state in which the slip ratio speed is constant by the reference slip ratio SR1, the vehicle speed estimating unit 13e may estimate an actual vehicle speed of the vehicle 2 at the time point. According to this, the vehicle control device 1 can also improve the estimation accuracy of the vehicle speed as compared to a case in which this is estimated based on the mean value of the wheel speeds of the wheels 3 and the like, thereby improving the control accuracy of the various pieces of control using the vehicle speed, for example.

Meanwhile, the actual slip ratio estimating unit 13c may estimate again the actual slip ratio after the time point at which it is changed from the state in which the slip ratio speed is constant according to the actual vehicle speed of the vehicle 2 estimated by the vehicle speed estimating unit 13e or may successively estimate the actual slip ratio based on the slip ratio speed obtained by the slip ratio speed detecting unit 13b and the S-dS/dt diagram corresponding to FIG. 3 set in advance.

Then, the braking/driving force controlling unit 13d monitors change in actual slip ratio estimated by the actual slip ratio estimating unit 13c and turns on the slip ratio control to inhibit the slip of the wheel 3 by controlling the braking/driving force generated at the wheel 3 when the actual slip ratio becomes larger than the target slip ratio (pressure decreasing threshold value) set in advance. The target slip ratio is an intended slip ratio set according to the above-described peak μ slip ratio Sμmax for the reference slip ratio SR1, for example, as illustrated in FIG. 4.

When the braking/driving force controlling unit 13d turns on the control to inhibit the slip of the wheel 3 by controlling the braking/driving force generated at the wheel 3, this controls the braking/driving force such that the slip ratio is within a predetermined range based on the reference slip ratio detected by the actual slip ratio estimating unit 13c. Herein, the braking/driving force controlling unit 13d controls the actuator 9 of the braking device 7, thereby decreasing the brake pressure to decrease the braking force when the slip ratio becomes larger than the target slip ratio set based on the reference slip ratio, and on the other hand, increasing the brake pressure to increase the braking force when the slip ratio becomes smaller than the target slip ratio.

The vehicle control device 1 configured as described above can improve the estimation accuracy of the actual slip ratio by estimating the actual slip ratio, which is the actual slip ratio, from the slip ratio speed calculated by the slip ratio speed detecting unit 13b based on the relationship between the slip ratio and the slip ratio speed set in advance. Furthermore, the vehicle control device 1 can improve the estimation accuracy of the actual slip ratio by correcting the slip ratio calculated by the slip ratio detecting unit 13a to estimate the actual slip ratio based on the reference slip ratio, which is always the substantially identical value according to the tire property of the wheel 3 irrespective of the condition such as the road surface μ, the vehicle speed of the vehicle 2, the load, the pneumatic pressure of the tire, and the manner of depressing the brake pedal 6. The vehicle control device 1 can execute the slip ratio control by using the actual slip ratio with high estimation accuracy, thereby preventing occurrence of the variation in the judgment of the start of the slip ratio control and executing the slip ratio control with the high robustness with respect to the variation in various conditions, and as a result, this may decrease the braking distance. Further, the slip ratio at the time point at which the slip ratio speed changes, that is to say, the reference slip ratio is necessarily the slip ratio smaller than the peak μ, slip ratio. Therefore, the vehicle control device 1 may utilize detection of a fact that the change rate of the slip ratio speed becomes larger than the predetermined value set in advance, that is to say, the detection itself of the change from the state in which the slip ratio speed is constant as the control start trigger of the slip ratio control. Therefore, the vehicle control device 1 can act as a guard function against execution of the slip ratio control at too early timing, for example, thereby making the timing of the start of the slip ratio control appropriate. Therefore, the vehicle control device 1 may appropriately perform the slip ratio control, thereby improving the control accuracy when controlling the slip state of the wheel 3.

Next, an example of the control of the vehicle control device 1 is described with reference to the flowchart in FIG. 6. This control routine is repeatedly executed at a control period of few ms to tens of ms.

First, the actual slip ratio estimating unit 13c of the vehicle control device 1 judges whether the change rate $d^2S/dt^2$ of the slip ratio speed is 0 as slip ratio reference judgment (S100).

When the actual slip ratio estimating unit 13c judges that the change rate $d^2S/dt^2$ of the slip ratio speed is 0 (S100: Yes), this estimates the actual slip ratio supposing that the slip ratio at a point at which the slip ratio reference is satisfied, that is to say, the slip ratio at a time point at which it is judged that the change rate $d^2S/dt^2$ of the slip ratio speed is 0 is the reference slip ratio SR1 set in advance (S102), finishes a current control period, and shifts to a next control period. When the actual slip ratio estimating unit 13c judges that the change rate $d^2S/dt^2$ of the slip ratio speed is not 0 (S100: No), this repeatedly executes the judgment until this is judged to be 0. In this case, the actual slip ratio estimating unit 13c estimates a subsequent actual slip ratio according to relationship between the slip ratio replaced for the last time and the reference slip ratio SR1. The braking/driving force controlling unit 13d executes the slip ratio control based on the actual slip ratio estimated by the actual slip ratio estimating unit 13c. Meanwhile, the judgment at the above-described S100 may be the judgment of whether $|d^2S/dt^2| \le a$ is satisfied when the slip ratio reference judging threshold value $a \approx 0$, for example.

The vehicle control device 1 according to the embodiment described above estimates the actual slip ratio of the wheel 3 from the slip ratio speed of the wheel 3 calculated according to the running state of the vehicle 2 based on the relationship between the slip ratio of the wheel 3 of the vehicle 2 and the slip ratio speed of the wheel 3 set in advance. Also, the vehicle control device 1 according to the above-described embodiment controls the slip state of the wheel 3 by controlling the braking/driving force generated at the wheel 3 by using the actual slip ratio of the wheel 3 estimated from the slip ratio speed of the wheel 3 according to the running state of the vehicle 2 based on the relationship between the slip ratio of the wheel 3 of the vehicle 2 and the slip ratio speed of the wheel 3 set in advance. Therefore, the vehicle control device 1 may improve the control accuracy when controlling the state of the vehicle 2, which is herein the control accuracy when controlling the slip state of the wheel 3, by decreasing the effect of the operation such as the manner of depressing the brake pedal 6 by the driver and the road surface, for example.

Meanwhile, the vehicle state calculating device and the vehicle control device according to the above-described embodiment of the present invention are not limited to the above-described embodiment and may be variously modified within the scope of claims.

Although it is described that the braking device 7 is the hydraulic braking device, which performs pressure braking using the hydraulic pressure, in the description above, the braking device 7 is not limited thereto. Any braking device 7 may be used as long as this may allow the braking force to act on the wheel 3, and this may be, for example, the device, which generates the braking force at the wheel 3 by so-called regenerative braking by the electric motor, which may operate as a power generator, and the like.

Although the slip ratio control is described as the braking force control of the vehicle control device 1 when the ABS function operates for inhibiting the slip, which might occur at the wheel 3 when the braking device 7 operates according to the depression operation of the brake pedal 6 by the driver, in the above description, this is not limited to the braking force control and may also be applied to the slip ratio control as driving force control. That is to say, the vehicle control device 1 is capable of executing the above-described slip ratio control as the driving force control when the TRC function operates for inhibiting the slip, which might occur by spin-out of the wheel 3 when the output of the driving source 5 increases according to the depression operation of the accelerator pedal 4 by the driver.

INDUSTRIAL APPLICABILITY

As described above, the vehicle state calculating device and the vehicle control device according to the present invention are preferably applied to a variety of vehicle state calculating devices and vehicle control devices, which control the state of the vehicle.

REFERENCE SIGNS LIST

1 VEHICLE CONTROL DEVICE
2 VEHICLE
3 WHEEL
4 ACCELERATOR PEDAL
5 DRIVING SOURCE
6 BRAKE PEDAL
7 BRAKING DEVICE
8 MASTER CYLINDER
9 ACTUATOR
10 WHEEL CYLINDER
11 HYDRAULIC BRAKING UNIT
12 WHEEL SPEED SENSOR
13a SLIP RATIO DETECTING UNIT
13b SLIP RATIO SPEED DETECTING UNIT
13c ACTUAL SLIP RATIO ESTIMATING UNIT
13d BRAKING/DRIVING FORCE CONTROLLING UNIT
13e VEHICLE SPEED ESTIMATING UNIT

The invention claimed is:

1. A vehicle state calculating device, comprising:
circuitry including:
a slip ratio detecting circuitry configured to obtain a slip ratio of a wheel according to a running state of a vehicle;
a slip ratio speed detecting circuitry configured to obtain a slip ratio speed of the wheel according to the running state of the vehicle;
an actual slip ratio estimating circuitry configured to estimate an actual slip ratio, which is the actual slip ratio of the wheel; and
a braking/driving force controlling circuitry configured to control a slip state of the wheel by controlling a braking/driving force generated at the wheel by using the actual slip ratio, wherein
the actual slip ratio estimating circuitry estimates the actual slip ratio of the wheel from the slip ratio speed of the wheel calculated by the slip ratio speed detecting circuitry according to the running state of the vehicle based on a relationship between the slip ratio of the wheel of the vehicle and the slip ratio speed of the wheel set in advance, and
the actual slip ratio estimating circuitry estimates the actual slip ratio by correcting the slip ratio of the wheel calculated according to the running state of the vehicle, when a change rate of the slip ratio speed becomes larger than a predetermined value set in advance, based on a difference between the calculated slip ratio calculated by the slip ratio detecting circuitry and a reference slip ratio determined in advance according to the relationship between the slip ratio and the slip ratio speed set in advance.

2. A vehicle state calculating device, comprising:
circuitry including:
a slip ratio detecting circuitry configured to obtain a slip ratio of a wheel according to a running state of a vehicle;
a slip ratio speed detecting circuitry configured to obtain a slip ratio speed of the wheel according to the running state of the vehicle; and
an actual slip ratio estimating circuitry configured to estimate an actual slip ratio, which is the actual slip ratio of the wheel; and
a braking/driving force controlling circuitry configured to control a slip state of the wheel by controlling a braking/driving force generated at the wheel by using the actual slip ratio, wherein
the actual slip ratio estimating circuitry estimates the actual slip ratio of the wheel from the slip ratio speed of the wheel calculated by the slip ratio speed detecting circuitry according to the running state of the vehicle based on a relationship between the slip ratio of the wheel of the vehicle and the slip ratio speed of the wheel set in advance, and
the actual slip ratio estimating circuitry estimates the actual slip ratio by correcting the slip ratio of the wheel calculated according to the running state of the vehicle, when a parameter corresponding to a differential value of the slip ratio speed becomes larger than the predetermined value set in advance, based on a difference between the calculated slip ratio calculated by the slip ratio detecting circuitry and a reference slip ratio determined according to the relationship between the slip ratio and the slip ratio speed set in advance.

3. The vehicle state calculating device according to claim 1, wherein a vehicle speed of the vehicle is calculated based on the estimated actual slip ratio and a wheel speed of the wheel.

4. A vehicle control device, comprising:
circuitry including:
a slip ratio detecting circuitry configured to obtain a slip ratio of a wheel according to a running state of a vehicle;
a slip ratio speed detecting circuitry configured to obtain a slip ratio speed of the wheel according to the running state of the vehicle;
an actual slip ratio estimating circuitry configured to estimate an actual slip ratio, which is the actual slip ratio of the wheel;
a braking/driving force controlling circuitry configured to control a slip state of the wheel by controlling a braking/driving force generated at the wheel by using the actual slip ratio, wherein
the actual slip ratio estimating circuitry estimates the actual slip ratio of the wheel from the slip ratio speed of the wheel calculated by the slip ratio speed detecting circuitry according to the running state of the vehicle based on a relationship between the slip ratio of the wheel of the vehicle and the slip ratio speed of the wheel set in advance, and
the actual slip ratio estimating circuitry estimates the actual slip ratio by correcting the slip ratio of the wheel calculated according to the running state of the vehicle, when a change rate of the slip ratio speed becomes larger than a predetermined value set in advance, based on a difference between the calculated slip ratio calculated by the slip ratio detecting circuitry and a reference slip ratio determined in advance according to the relationship between the slip ratio and the slip ratio speed set in advance.

5. A vehicle control device, comprising:
circuitry including:
- a slip ratio detecting circuitry configured to obtain a slip ratio of a wheel according to a running state of a vehicle;
- a slip ratio speed detecting circuitry configured to obtain a slip ratio speed of the wheel according to the running state of the vehicle;
- an actual slip ratio estimating circuitry configured to estimate an actual slip ratio, which is the actual slip ratio of the wheel; and
- a braking/driving force controlling circuitry configured to control a slip state of the wheel by controlling a braking/driving force generated at the wheel by using the actual slip ratio, wherein the actual slip ratio estimating circuitry estimates the actual slip ratio of the wheel from the slip ratio speed of the wheel calculated by the slip ratio speed detecting circuitry according to the running state of the vehicle based on a relationship between the slip ratio of the wheel of the vehicle and the slip ratio speed of the wheel set in advance, and the actual slip ratio estimating circuitry estimates the actual slip ratio by correcting the slip ratio of the wheel calculated according to the running state of the vehicle, when a parameter corresponding to a differential value of the slip ratio speed becomes larger than the predetermined value set in advance, based on a difference between the calculated slip ratio calculated by the slip ratio detecting circuitry and a reference slip ratio determined according to the relationship between the slip ratio and the slip ratio speed set in advance.

6. The vehicle state calculating device according to claim 2, wherein a vehicle speed of the vehicle is calculated based on the estimated actual slip ratio and a wheel speed of the wheel.

* * * * *